R. E. LAIRD & J. H. RANEY.
TREATER FOR PETROLEUM EMULSIONS.
APPLICATION FILED JULY 22, 1914.
1,142,759.
Patented June 8, 1915.
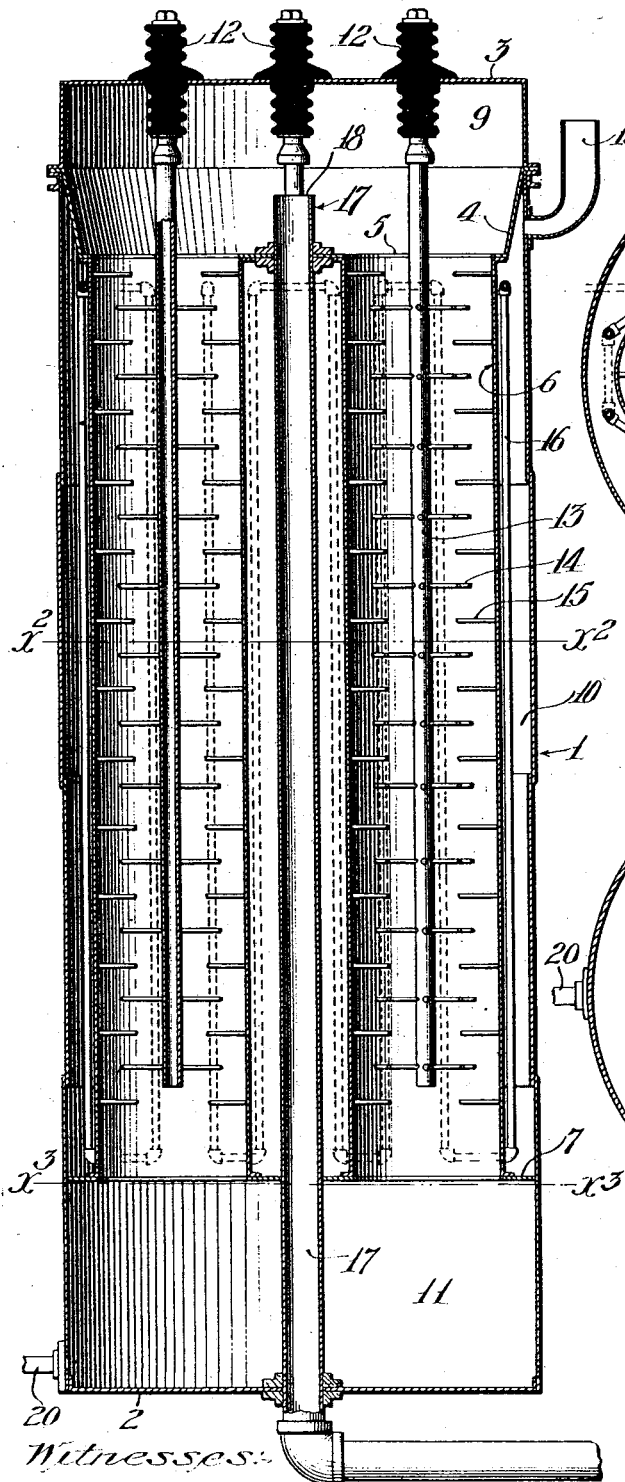
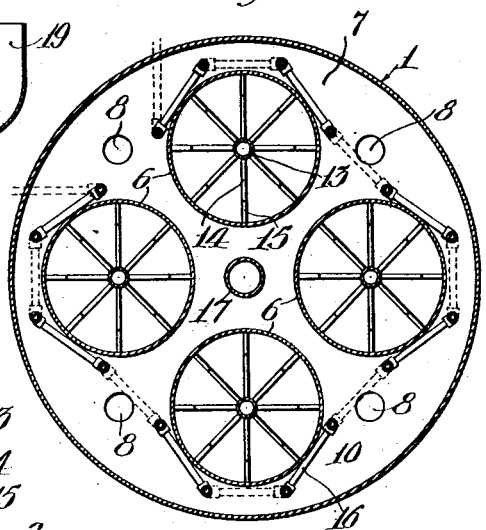
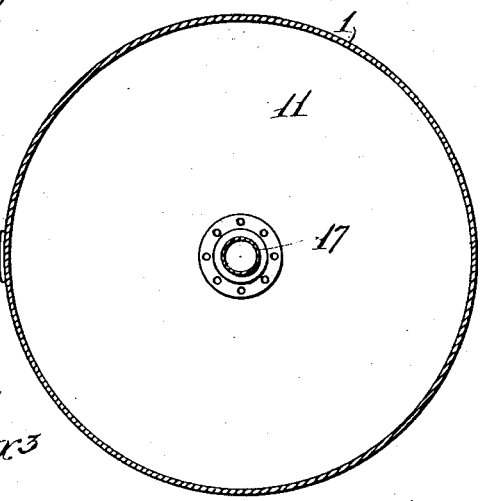
Inventors
Robert E. Laird
Joseph H. Raney

UNITED STATES PATENT OFFICE.

ROBERT E. LAIRD AND JOSEPH H. RANEY, OF TAFT, CALIFORNIA, ASSIGNORS, BY DIRECT AND MESNE ASSIGNMENTS, TO RANEY-LAIRD PETROLEUM DEHYDRATING COMPANY, OF LOS ANGELES, CALIFORNIA, A CORPORATION OF CALIFORNIA.

TREATER FOR PETROLEUM EMULSIONS.

1,142,759.      Specification of Letters Patent.      Patented June 8, 1915.

Application filed July 22, 1914. Serial No. 852,482.

*To all whom it may concern:*

Be it known that we, ROBERT E. LAIRD and JOSEPH H. RANEY, citizens of the United States, both residing at Taft, in the county of Kern, State of California, have invented a new and useful Treater for Petroleum Emulsions.

Our invention relates to treaters for emulsions and more particularly to treaters used for breaking up and separating emulsified water from petroleum oils.

Water is commonly found in petroleum oils in two forms. First, as large globules of free water which readily settle out if allowed to stand, and second, in small particles of trapped water which form an emulsion with the oil and which will not settle out even if allowed to stand for a long time.

The principal object of our invention is to provide a treater which will convert trapped water into free water.

Previous inventors have attempted to treat oil by the application of electric potentials thereto, but so far as we are aware they have attempted to do this by passing the oil downwardly between charged electrodes. In our invention the oil is passed upwardly between such electrodes with the result that the liquid in the top of the treater has been practically freed of water. This results in a high insulation factor on the surface of the treater and does away with the necessity for special insulation on the electrodes passing through this surface. This upward movement of the freed oil and downward movement of the freed water is also of great value in providing a positive separation of these liquids as they both move in the direction enforced on them by the action of gravity. Such a separation is therefore independent of the speed of the entering emulsion so long as this speed is kept below a certain value.

Further objects and advantages will be evident hereinafter.

Referring to the drawings, which are for illustrative purposes only; Figure 1 is a vertical section through a particular form of our invention. Fig. 2 is a section on the plane $x^2$—$x^2$ of Fig. 1. Fig. 3 is a section on the plane $x^3$—$x^3$ of Fig. 1.

The treater consists of a tight outer shell 1 having a tight bottom 2 and a tight top 3. Secured near the top of the treater is a pan 4 forming a tight closure therewith and having four holes 5 formed therein in each of which is placed an outer electrode 6 which is of cylindrical form and which extends downwardly and forms a tight closure at its lower end with a plate 7. The plate 7 is provided with four holes 8. The interior of the treater is thus divided up into an upper chamber 9, an intermediate chamber 10 between the pan 4 and the plate 7 and a lower chamber 11 below the plate 7, the outer electrode 6 forming an open passageway between the chambers 9 and 11 and the holes 8 providing a passageway between the chambers 10 and 11. Insulators 12 are supported on the top 3 and each carries an inner electrode 13 which extends down through the center of the outer electrodes 6 as shown in Fig. 1. The inner electrodes have a series of points 14 formed thereon and the outer electrodes have a series of points 15 formed thereon, these points forming the spark terminals from which an electrical discharge takes place upon the application of proper potential to the outer electrode 6 and the inner electrode 13. A heating coil 16 is provided in the chamber 10 for the purpose of heating the oil and reducing its viscosity. A central outlet pipe 17 passes through the bottom 2, the plate 7, and the pan 4, forming a tight closure therewith, and extends upwardly as shown at 18 into the pan 4. An emulsion inlet pipe 19 enters the chamber 10 just below the pan 4 and a water outlet pipe 20 enters the chamber 11 at the bottom thereof.

The method of operation is as follows: A body of emulsion is allowed to flow through the pipe 19 into the central chamber 10 passing out of the chamber 10 into the chamber 11 through the outer electrode 6 and between the points 14 and 15 formed on the outer and inner electrodes. A suitable electromotive force being impressed between these electrodes a discharge then takes place between these points which tends to line up the water particles into chains and to break up the dividing walls and coalesce these particles into globules of free water. The greater portion of this free water settles out of the emulsion into the bottom of the chamber 11 and is removed through the outlet pipe 20. A small part of the free water together with a little emulsion is carried upwardly by the free oil into the pan 4 and overflows into the pipe 17 by means of which it may be taken to any convenient form of separating means, such as settling tanks or the like.

We claim as our invention:

1. A treater for emulsions of petroleum oil and water comprising a shell, a pan dividing the shell into two compartments, hollow outer electrodes fixed in said pan providing an open communication between the compartments, and an inner electrode in each outer electrode.

2. A treater for emulsions of petroleum oil and water comprising a shell, a pan dividing the shell into two compartments, hollow outer electrodes fixed in said pan providing an open communication between the compartments, a series of projections projecting inwardly from the inner wall of said outer electrodes, and an inner electrode in each outer electrode, said inner electrodes having a series of projections on their outer surfaces.

3. A treater for emulsions of petroleum oil and water comprising a shell, a pan forming a tight closure with said shell and dividing the shell into upper and lower compartments, a series of hollow outer electrodes making a tight closure with said pan and providing an open communication between said compartments, an inner electrode in each of said outer electrodes suitably insulated therefrom, means for supplying emulsion to the lower compartment, means for removing cleaned oil from the upper compartment, means for removing free water from the lower compartment, and means for impressing an electromotive force between said electrodes.

4. A treater for emulsions of petroleum oil and water comprising a cylindrical shell, a pan forming a tight joint with said shell near the top thereof and dividing said shell into an upper and a lower compartment, a series of hollow outer electrodes forming a tight joint with said pan and extending downwardly in said lower compartment, an inner electrode in each of said outer electrodes suitably insulated therefrom, means for supplying an emulsion below said pan, and means for drawing liquid out of the upper compartment.

5. A treater for emulsions of petroleum oil and water comprising an outer cylindrical shell, a bottom forming a tight closure with said shell, a pan located near the top of and forming a tight closure with said shell, a top for said shell, a series of hollow cylindrical outer electrodes making a tight closure with said pan and extending downwardly therefrom, a series of inner electrodes supported by said top and insulated therefrom and each projecting downwardly into an outer electrode, means for admitting an emulsion below said pan, and means for removing fluids from above said pan.

6. In a treater for petroleum emulsions a treating chamber comprising a hollow member having a series of projections secured to its inner wall and extending inwardly from said wall, means for introducing an emulsion of oil and water into the treater, means for withdrawing the separated oil and water from the treater, and an inner electrode centrally located in said member and having a series of projections extending outwardly therefrom.

7. A treater for emulsions comprising a containing vessel, a wall dividing said vessel into an upper compartment and a lower compartment, a hollow conduit fixed in said wall providing an open communication between said upper compartment and said lower compartment, and treating means in said conduit.

8. A treater for emulsions comprising a containing vessel, a wall dividing said vessel into an upper compartment and a lower compartment, a hollow conduit fixed in said wall providing an open communication between said upper compartment and said lower compartment, electrodes in said conduit, and means for impressing an electromotive force between said electrodes.

9. A treater for emulsions comprising a containing vessel, a wall dividing said vessel into an upper compartment and a lower compartment, a hollow conduit fixed in said wall providing an open communication between said upper compartment and said lower compartment, an electrode in said conduit, and means for impressing an electromotive force between said conduit and said electrode.

10. A treater for emulsions comprising a containing vessel, a wall dividing said vessel into an upper compartment and a lower compartment, means for supplying emulsion to said lower compartment, means for withdrawing light liquid from the upper compartment, means for withdrawing heavy liquid from the lower compartment, a hollow conduit fixed in said wall providing an open communication between said upper compartment and said lower compartment, and treating means in said conduit.

11. A treater for emulsions comprising a containing vessel, a wall dividing said vessel into an upper compartment and a lower compartment, means for supplying emulsion to said lower compartment, means for withdrawing light liquid from the upper compartment, means for withdrawing heavy liquid from the lower compartment, a hollow conduit fixed in said wall providing an open communication between said upper compartment and said lower compartment, electrodes in said conduit, and means for impressing an electromotive force between said electrodes.

12. A treater for emulsions comprising a containing vessel, a wall dividing said vessel into an upper compartment and a lower compartment, means for supplying emulsion to said lower compartment, means for withdrawing light liquid from the upper compartment, means for withdrawing heavy liquid from the lower compartment, a hollow conduit fixed in said wall providing an open communication between said upper compartment and said lower compartment, an electrode in said conduit, and means for impressing an electromotive force between said conduit and said electrode.

13. A treater for emulsions comprising a containing vessel, a wall dividing said vessel into an upper compartment and a lower compartment, a light liquid discharge pipe centrally located in said containing vessel and extending through and forming a tight closure with the bottom of said vessel and extending through and forming a tight closure with said wall, means for introducing emulsion into said lower compartment, means for withdrawing heavy liquid from said lower compartment, a series of conduits secured in openings in said wall about said light liquid discharge pipe, said conduits forming open passageways between said upper and lower compartments, and treating means in each conduit.

14. A treater for emulsions comprising a containing vessel, a wall dividing said vessel into an upper compartment and a lower compartment, a light liquid discharge pipe centrally located in said containing vessel and extending through and forming a tight closure with the bottom of said vessel and extending through and forming a tight closure with said wall, means for introducing emulsion into said lower compartment, means for withdrawing heavy liquid from said lower compartment, a series of conduits secured in openings in said wall about said light liquid discharge pipe, said conduits forming open passageways between said upper and lower compartments, electrodes in said conduits, and means for impressing an electromotive force between said electrodes.

15. A treater for emulsions comprising a containing vessel, a wall dividing said vessel into an upper compartment and a lower compartment, a light liquid discharge pipe centrally located in said containing vessel and extending through and forming a tight closure with the bottom of said vessel and extending through and forming a tight closure with said wall, means for introducing emulsion into said lower compartment, means for withdrawing heavy liquid from said lower compartment, a series of conduits secured in openings in said wall about said light liquid discharge pipe, said conduits forming open passageways between said upper and lower compartments, inner and outer electrodes in said conduits, and means for impressing an electromotive force between said outer and inner electrodes.

16. A treater for emulsions comprising a containing vessel, a wall dividing said vessel into an upper compartment and a lower compartment, a light liquid discharge pipe centrally located in said containing vessel and extending through and forming a tight closure with the bottom of said vessel and extending through and forming a tight closure with said wall, means for introducing emulsion into said lower compartment, means for withdrawing heavy liquid from said lower compartment, a series of conduits secured in openings in said wall about said light liquid discharge pipe, said conduits forming open passageways between said upper and lower compartments, an inner electrode in each of said conduits, and means for impressing an electromotive force between the wall of each of said conduits and the inner electrode in said conduit.

17. A treater for emulsions comprising a containing vessel, a wall dividing said vessel into an upper compartment and a lower compartment, a light liquid discharge pipe centrally located in said containing vessel and extending through and forming a tight closure with the bottom of said vessel and extending through and forming a tight closure with said wall, means for introducing emulsion into said lower compartment, means for withdrawing heavy liquid from said lower compartment, a series of conduits secured in openings in said wall about said light liquid discharge pipe, said conduits forming open passageways between said upper and lower compartments, a series of inwardly projecting points in each of said conduits, an inner electrode in each of said conduits, and means for impressing an electromotive force between each of said points and said inner electrodes.

18. A treater for emulsions comprising a containing vessel, a wall dividing said vessel into an upper compartment and a lower compartment, a light liquid discharge pipe centrally located in said containing vessel and extending through and forming a tight closure with the bottom of said vessel and extending through and forming a tight closure with said wall, means for introducing emulsion into said lower compartment, means for withdrawing heavy liquid from said lower compartment, a series of conduits secured in openings in said wall about said light liquid discharge pipe, said conduits forming open passageways between said upper and lower compartments, a series of inwardly projecting points in each of said conduits, an inner electrode in each of said conduits, a series of outwardly projecting points on each of said inner electrodes, and means for impressing an electromotive force between said outer and said inner points.

19. In a treater for petroleum emulsions, a treating chamber comprising a hollow member having a series of outer projections secured to its inner wall extending inwardly from said wall, an inner electrode centrally located in said hollow member and having a series of inner projections extending outwardly therefrom, means for introducing an emulsion of oil and water into the treater, means for withdrawing the separated oil and water from the treater, and means for causing a disruptive electric discharge to take place between said outer projections and said inner projections.

20. In a treater for petroleum emulsions a treating chamber having a series of points projecting inwardly from the walls of the chamber, a series of points connected to an inner electrode and projecting outwardly therefrom, means for electrically insulating the inner electrode from walls of the treating chamber, means for impressing an electromotive force between the inner electrode and the walls of the chamber, means for introducing an emulsion of oil and water into the bottom of said chamber, means for withdrawing water from below said chamber, and means for withdrawing dehydrated oil from above the chamber.

21. In a treater for petroleum emulsions a treating chamber having a series of points projecting inwardly from the walls of the chamber, a series of points connected to an inner electrode and projecting outwardly therefrom, means for electrically insulating the inner electrode from walls of the treating chamber, means for intermittently impressing an electromotive force between the inner electrode and the walls of the chamber, means for introducing an emulsion of oil and water into the bottom of said chamber, means for withdrawing water from below said chamber, and means for withdrawing dehydrated oil from above the chamber.

In testimony whereof, we have hereunto set our hands at Los Angeles, California, this 15th day of July, 1914.

ROBERT E. LAIRD.
JOSEPH H. RANEY.

In presence of—
FRED A. MANSFIELD,
FORD W. HARRIS.